United States Patent Office 3,389,008
Patented June 18, 1968

3,389,008
URETHANE COATED SYNTHETIC CELLULOSIC BOARD
Maurice E. Bailey, Orchard Park, N.Y., assignor to Allied Chemical Corporation, New York, N.Y., a corporation of New York
No Drawing. Filed Oct. 26, 1964, Ser. No. 406,550
6 Claims. (Cl. 117—57)

ABSTRACT OF THE DISCLOSURE

Urethane coated synthetic boards are produced by applying moisture-cure urethane coating compositions having free isocyanato groups to a synthetic cellulosic board substrate which is at a temperature of at least 100° F. and is still exuding moisture caused by the heat and pressure applied during the formation of said substrate.

---

This invention is concerned with synthetic board, by which term it is intended to refer to fiber board and particle board. Such products, as is well known, are manufactured in sheets of more or less intricate shapes from fibers, platelets or splinters of wood or other ligno-cellulosic materials, bonded together by pressure with or without a synthetic resin binder. Although wood particles are usually used, other ligno-cellulosic materials such as flax, bagasse, lemon grass, straw and the like have been processed in this manner also. Binders such as fast curing thermosetting synthetic resins, e.g., urea-formaldehyde, urea-melamine-formaldehyde, and phenol-formaldehyde resins are commonly used.

The process of forming the synthetic board generally involves the steps of admixing the wood particles (or fibers) with the resin binder and thereafter forming a mat of the mixture. The mat is placed in a suitable forming device wherein the particles are pressed into the desired shape and by means of heat caused to adhere due to the curing of the resin present in the mat. Moisture present in the wood and formed during the curing of the resin is expressed from the board assisted by the heat and pressure. During the curing step, the resin flows between the wood particles developing an intimate bond among the particles and on curing provides the rigidity and strength desired in the finished board. After removal from the forming device which may be a hydraulic press or an extrusion means, the hot board may be subjected to further treatment such as humidification, sanding etc. Thereafter, the treated board is often finished using either lacquers or various paint coatings.

The use of lacquers and various paint coatings on the synthetic board substrate is subject to one or more disadvantages. Thus, many of such coatings are sensitive to moisture, and hence to prevent blooming or lack of adhesion, it is essential that the coating be applied to a cured, cool dry board. Many paints require relatively long dry times and hence require drying ovens or large areas for storage of the freshly painted piece. Coatings which comprise volatile organic solvents are applied to cold substrates to avoid the danger of blistering and poor adhesion. Hence, means for cooling the synthetic board rapidly or provision of storage space must be provided, in this instance, also. Accordingly, the finishing of synthetic board has been a costly and time consuming operation.

It is, therefore, an object of this invention to provide an improved process for coating synthetic board and a novel coated synthetic board.

Another object is to provide a process wherein synthetic board is coated while still hot and exuding moisture.

Still another object is to provide a process wherein synthetic board is coated with a durable, impact resistant and well-adhering finish.

These and other objects of my invention will be apparent from the following description.

I have fortuitously discovered a unique process for preparing a coated synthetic board comprising applying a moisture-cure urethane coating composition having free isocyanato groups to a synthetic board substrate, said substrate exuding moisture and being at a temperature of at least 100° F.

The synthetic board can be a particle board or a fiber board depending on whether particulate or fibrous material is used in its preparation. Ligno-cellulosic material is commonly used together with a resin binder in conventional preparations of synthetic board. The board is prepared under heat and pressure which is used to form the board and cure the binder simultaneously. The heat is above 200° F. and the pressure above 200 p.s.i. During the application of heat and pressure, moisture is exuded form the board. This moisture is part of the natural content of the ligno-cellulosic or other cellulose material and the resin binder and is also a reaction product of the resin during reaction. The moisture content can range from 0.5% to 15% of the total weight of the board ingredients and is, generally, from about 5% to 10%. The exudation of moisture continues for a period of time after the heat and pressure is removed and must be present during the coating step. The board also retains the heat for a period of time after the heat is removed although its temperature is constantly decreasing. As noted, the temperature of the board must be at least about 100° F. It is preferably at a temperature of about 200° F. to about 450° F.; however, optimum temperature is considered to be about 250° F. to about 350° F.

A coating applied according to the invention dries and cures rapidly. A one mil coating is tack-free in thirty seconds or less and a five mil coating can be handled without damage in about four or five minutes. This is a surprising and valuable feature of my invention since the same coating compositions applied to cold substrates in the conventional manner require about one-half hour or more to become tack-free for a one mil coating and about 2 hours or more for a five mil coating. Further, the coatings thus obtained by application to the hot boards are free from blisters which normally are produced when hot surfaces are coated with various compositions. The coatings also possess excellent adhesion, durability, and resistance to abrasion, impact, chemicals, solvents, and water.

Moisture-cure urethane coating compositions which contain free isocyanato groups, usually at terminal positions of the polymer chain, are well known in this art (e.g., see Saunders et al.: Polyurethanes: Chemistry and Technology; Part II. Technology; High Polymers, vol. XVI, Interscience Publishers, 1964, pages 477 to 485). Such compositions are derived from prepolymers prepared by reaction of polyols such as polyether polyols, vegetable oils, such as castor oil, or polyesters with organic polyisocyanates, the latter component being used in excess.

The rapid drying and cure of the urethane coatings to a tack-free state result in unexpected economic benefits. The coated boards can be handled and stored in a matter of minutes after finishing, thereby reducing to a practical minimum the space required for processing the boards. Curing ovens and drying racks are not necessary, since the boards can be removed from the finishing line and stacked in the storage area wherein equilibration of moisture content within the boards and post cure of the urethane coating proceeds in a normal manner.

As indicated above, the moisture-cured urethane coating compositions utilized in the present invention are well known products. They usually contain an isocyanate terminated prepolymer derived from a polyol and an organic diisocyanate which prepolymer is dissolved in an anhydrous low boiling organic solvent, e.g., toluene, xylene, ethyl acetate, and the like as well as mixtures of said solvents. The composition may contain adjuvants such as ultraviolet absorbers, viscosity control agents and the like. The compositions are available both as clear varnishes or as pigmented coatings. In the latter instance the pigments used are usually inorganic and free from moisture. The compositions contain free isocyanato groups usually within the range of from 1 to 5% based on the weight of the entire composition. The total solids content of these compositions may vary considerably depending upon the manner of application to be used. Thus, compositions intended for application by spray gun may contain from about 50% to 80% total solids. Compositions intended for application by brushing may contain from about 30% to about 60% total solids. Compositions intended for application by spray gun technique are preferred in the present instance.

The synthetic board can be coated immediately upon its removal from the forming device or, as is preferred, after sanding to remove rough edges and/or other irregularities, such as hand hold punch-outs and the like. These operations, especially when conducted on a production line basis are accomplished within minutes of the time the board is removed from the forming device and while the board is still relatively hot.

The thickness of the coatings applied can be varied over a considerable range. For example, the thickness can be as little as 0.4 mil or as much as 5 mils or more. Several coats rapidly applied as by "cross hatching" are usually preferred, to insure complete coverage especially when the synthetic board is produced by means of an intricately shaped mold. As will be evident to those skilled in this art, the dry time and curing of the applied coating will increase as the thickness of the coating increases, but in all instances these characteristics of the coatings applied to the hot synthetic board in the manner of this invention will be surprisingly superior to coatings applied to a substrate which is at ambient temperature, i.e., "cold."

The following examples will illustrate the practice of my invention. Parts and percentages are by weight and temperatures are given in degrees Fahrenheit.

Example 1

The synthetic resin binder used in this example was a mixture of the following:

|  | Parts |
|---|---|
| An aqueous non-resinous urea-formaldehyde reaction product having about 86% total solids, a mol ratio of about 4.7 mols formaldehyde per mol of urea and a pH of at least 7.0, prepared as described in U.S.P. 2,652,377 | 2000 |
| Urea | 500 |
| Melamine | 700 |
| Water | 200 |
| Ammonium sulfate | 40 |

The resultant mixture has a viscosity of 260 cps. and a pH of 5.7.

This synthetic resin binder, 928 parts, was sprayed onto 4400 parts of pine furnish together with 96 parts of a paraffin wax emulsion (available commercially under the trade designation of Paracol Wax), to impact moisture resistant character to the finished board. The spray time was 3 minutes and the pine furnish was mixed in a conventional blender during the addition of the binder. The resultant mixture contained 15% binder and 1% paraffin wax. The moisture content of the pine furnish was 2.1% before addition of the binder and 8.0% thereafter.

A 14" x 24" mat was formed using 1700 parts of the binder-wood particle mixture. The mat was then placed in a Pasadena Hydraulic Press equipped with 24" x 24" electrically heated platens. The mat was compressed under 750 p.s.i.g. and at 380° to a ¼" board in a two minute cycle.

The resultant particle board was removed from the press and sprayed with a pigmented moisture cure urethane coating composition applying a film of 0.5 mil thickness. The resultant coated board was tack-free in less than one minute.

The coated particle board was exposed for 538 hours in a Weather-Ometer. The board swelled 1.3% of its original thickness.

A similarly prepared particle board that was not coated with the urethane composition used above, exposed in the Weather-Ometer for 538 hours, swelled 6.6% of its original thickness.

This Weather-Ometer test indicates the effectiveness of the urethane film as a moisture barrier and also the substantial freedom of the coating from pin holes which may be due to blistering.

The urethane coating composition used in this experiment was a low gloss pigmented moisture-cure urethane coating composition containing 65.2% total solids, of which 18.1% was lead chromate and 17.7% was siliceous material and contained 2.58% free isocyanato groups. The urethane resin portion of the composition was prepared by reacting an excess of a polyisocyanate with a polyol according to the process described in Saunders et al., supra. Also see description in Technical Bulletin of the Better Finishes and Coatings Division, Essex Chemical Corporation, Clifton, N.J., C91-001, 91-900 series.

Example 2

A coated particle board was prepared in a similar manner to that described above save that the coating applied was of 1.1 mils in thickness. This coating was tack-free in about 2 minutes.

The coated board was exposed for 538 hours in the Weather-Ometer and thereafter was found to have swelled only 0.16% of its original thickness.

Example 3

The binder used in this example was a mixture of:

|  | Parts |
|---|---|
| The non-resinous urea-formaldehyde reaction product used in Example 1 above | 3000 |
| Urea | 750 |
| Melamine | 1050 |
| Water | 300 |
| Ammonium sulfate | 45 |

This binder which contains 70% solids was sprayed onto pine furnish as described in Example 1 above. Thus, 730 parts (15%) of the binder together with 75 parts of Paracol wax Emulsion (1% wax) was sprayed onto 3500 parts of pine furnish in a blender and in 2.5 minutes.

The pine furnish contained 2.9% moisture. The mixture of wood particles and binder contained 7.0% moisture.

A 12" x 15.5" mat was prepared from 800 parts of the wood particle-resin binder mixture and this mat was pressed in the heated hydraulic press used in Example 1 to form a ¼" particle board, using 750 p.s.i.g., at 370° and a 2 minute curing cycle.

The hot particle board was removed from the press and 90 seconds thereafter it was coated by spraying for 20 seconds with the same pigmented moisture cure urethane coating composition as used in Example 1 above. The coating, which was 3 mil in thickness, was tack-free in less than 3 minutes.

The durability of the coatings after 24 hours cure time was determined by the Standard Tabor Abrasion Procedure (ASTM D-1044) and the results are given in Table 1 below.

Example 4

A particle board was prepared as described in Example 3 above and coated with the pigmented moisture-cure urethane coating composition described in Example 1 above. A 5 mil coating was applied which become tack-free in 4½ minutes. The durability of this coating after 24 hours is shown in Table 1 below, also.

Example 5

A particle board was prepared substantially as described in Example 4 above with the exception that the wood particle-binder mat was precured for about 15 to 30 seconds on the heated platen before curing by pressing and heating. The hot board was coated 90 seconds after removal from the press, by spraying for 30 seconds with the pigmented moisture-cure urethane coating composition described in Example 1 above. The 5 mil coating, so applied, was tack-free in 3 minutes. The durability of the cured coating is indicated in Table 1 below.

TABLE 1

| Board From— | Wt. loss,* g. | |
| --- | --- | --- |
| | 500 cycles | 1,000 cycles |
| Ex. 3 | .043 | .067 |
| Ex. 4 | .029 | .045 |
| Ex. 5 | .028 | .043 |

*Calibrase CS-17 wheel with 500 gram weight used.

Example 6

Beverage cases were prepared by molding wood particle-synthetic resin binder mixture similar to that described in Example 3. The molding was carried out by hand filling a heated mold of intricate design in a Colli Press using 200 kg./cm.$^2$ ram pressure and a temperature of 356° for 3 minutes. The molded article was removed from the press and 1.5 minutes were required to remove hand hold punchouts and to smooth all rough edges by sanding. The hot molded article was then coated by spraying during about one minute a 1 mil coating of moisture cure urethane resin composition using a pressurized spray gun with 25 p.s.i. atomization pressure. The coating was tack-free within 30 seconds. Accordingly, within 3 minutes after removing the molded particle board case from the press, the finished case could be removed from the production line and transferred to storage. Normal finishing of similar molded pieces requires hours to cool the piece and/or hours to apply and to dry the finished piece with or without conventional drying/curing ovens.

The urethane coating composition used in this experiment contained 54% total solids, of which 25% was lead chromate pigment and 3% siliceous material, and 1.73% free isocyanato groups.

It can thus be seen that an effective and economical procedure for applying urethane finishes to synthetic board, especially particle board has been provided and that this novel procedure can be utilized with either flat synthetic board stock or with articles composed of bonded ligno-cellulosic materials molded into intricate shapes or forms. The synthetic board materials can be cured by flat pressing or extrusion methods and the coating composition can be applied to the hot synthetic board by any conventional means such as brushing, spraying, dipping, roll-coating, and the like.

Although certain preferred embodiments of the invention have been disclosed and illustrated in the examples, it will be evident that various changes in, and modifications of these details can be made without departing from the scope or spirit of this invention.

I claim:

1. A process for preparing a coated synthetic board comprising applying a moisture-curable urethane coating composition having free isocyanato groups to a synthetic cellulosic board substrate having a moisture content of 0.5 to 15% by weight, said substrate exuding moisture and being at a temperature of at least 100° F.

2. The process defined in claim 1 wherein the synthetic board substrate is a particle board substrate.

3. The process defined in claim 1 wherein the synthetic board substrate is a fiber board substrate.

4. The process defined in claim 1 wherein the substrate is at a temperature of about 200° F. to about 450° F.

5. The process of claim 1 wherein the exuding of moisture is caused during the formation of said substrate.

6. The process of claim 5 wherein the temperature is in the range of 200° F. to about 450° F.

References Cited

UNITED STATES PATENTS

| | | | |
| --- | --- | --- | --- |
| 2,531,392 | 11/1950 | Breslow | 117—148 X |
| 2,702,761 | 2/1955 | Mannheim | 117—57 X |
| 3,012,987 | 12/1961 | Ansul | 117—148 X |
| 3,166,434 | 1/1965 | Gauger | 17—60 X |
| 3,194,793 | 7/1965 | Kogon | 117—148 X |
| 3,243,140 | 3/1966 | Bliven et al. | 117—57 X |

FOREIGN PATENTS

| | | |
| --- | --- | --- |
| 584,380 | 1/1947 | Great Britain. |
| 851,540 | 10/1960 | Great Britain. |

OTHER REFERENCES

New Horizons for Wood, Pacific Plastics, vol. 2, No. 1, pp. 14–15.

WILLIAM D. MARTIN, *Primary Examiner.*

M. LUSIGNAN, *Assistant Examiner.*